INVENTORS
JOHN D. WATTS
ERWIN F. HILL
BY Cushman, Darby & Cushman
ATTORNEYS

Jan. 25, 1966  J. D. WATTS ETAL  3,231,297
EXPANSIBLE PIPE JOINT CLAMP
Filed July 31, 1961  3 Sheets-Sheet 2

INVENTORS
JOHN D. WATTS
ERWIN F. HILL
BY Cushman, Darby & Cushman
ATTORNEYS

Jan. 25, 1966    J. D. WATTS ETAL    3,231,297
EXPANSIBLE PIPE JOINT CLAMP
Filed July 31, 1961    3 Sheets-Sheet 3
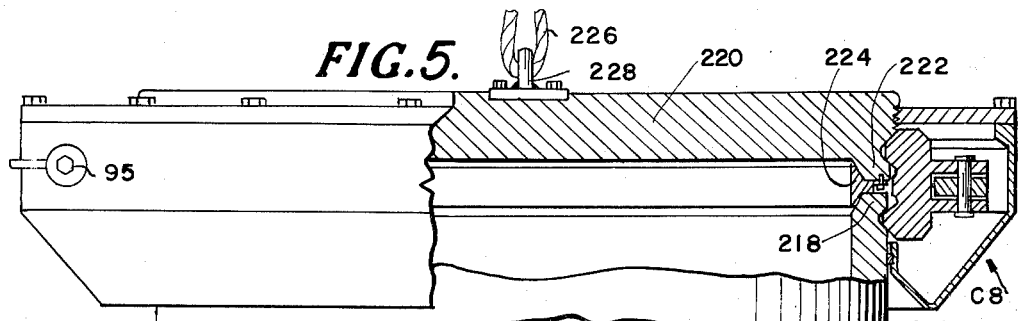
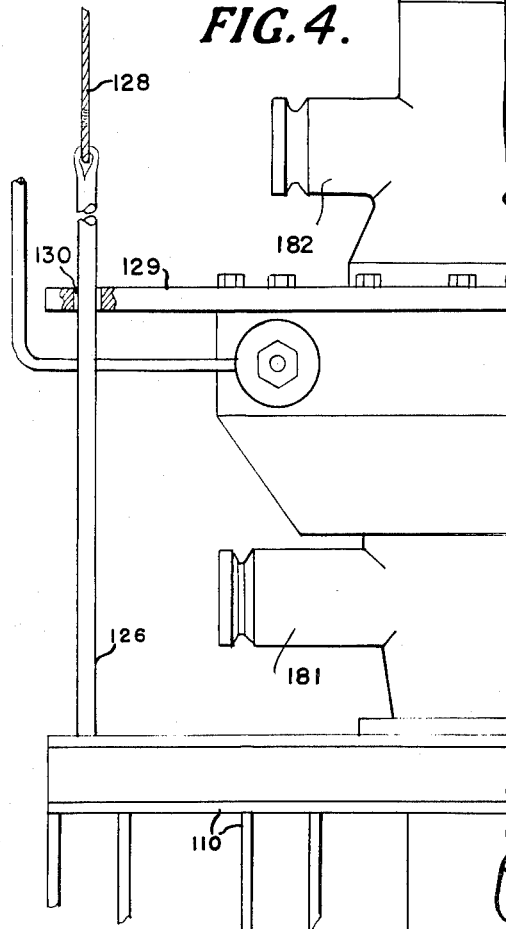
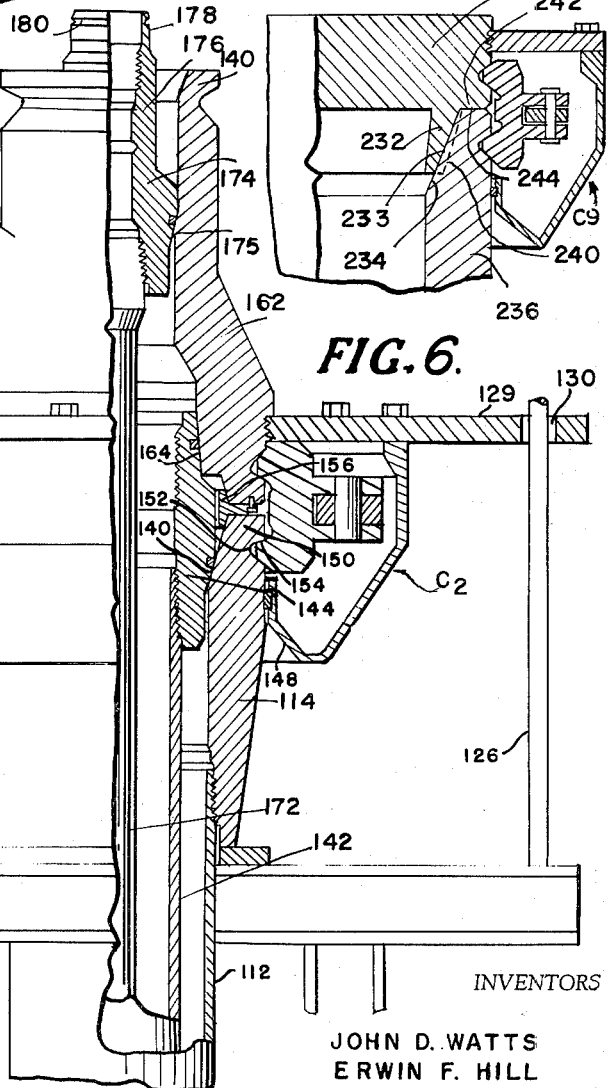
INVENTORS
JOHN D. WATTS
ERWIN F. HILL
BY Cushman, Darby & Cushman
ATTORNEYS United States Patent Office 3,231,297
Patented Jan. 25, 1966

3,231,297
EXPANSIBLE PIPE JOINT CLAMP
John D. Watts and Erwin F. Hill, Houston, Tex., assignors to Gray Tool Company, Houston, Tex., a corporation of Texas
Filed July 31, 1961, Ser. No. 128,174
4 Claims. (Cl. 285—24)

The present invention relates to means for effecting a sealing connection as between conduit parts or closures, particularly at inaccessible locations, or where danger may be involved for a person to approach the vicinity of the connection. The invention is particularly useful in effecting such connections between the various wellhead parts of oil and gas wells, the wellheads being often located at inaccessible positions, such as in deep cellars which may become filled with gas, or even deep beneath the surface of the water, as in offshore or ocean drilling operations. While the invention is described in relation to its particular application of selectively and rapidly mounting and changing the wellhead parts of an oil and gas well installation, it will be understood that it has many other important applications, such as effecting and breaking sealing connections between vessels and closures and conduit or other parts in fluid systems which may be in dangerous locations, due for instance to the handling of contaminating fluids, the danger of radiation, or other such reasons.

Various other objects and advantages of the invention will be apparent as the description herein progresses.

FIGURE 1 is a vertical sectional view through a part of a wellhead showing the contractile clamp assembly (generally indicated at C) applied to one of the wellhead parts (in this instance, the tubing head cap on which the Christmas tree is carried), to releasably secure same to the tubing head of a well. It will be understood that this clamp assembly may be provided with remote controlled means as hereinafter described, for contracting and expanding or releasing the clamping elements of the assembly. This section is taken substantially along the line 1—1 of FIGURE 2. It will be understood that the description of the assembly C and the associated parts is intended to apply to the application of the invention to other wellhead and other parts where the invention may be usefully employed.

FIGURE 4 is a side elevation view of a portion of a wellhead, partly in section illustrating how the invention may be used in stages of the completion of an oil well.

FIGURE 5 is a side elevational view, partly in section, showing the application of the invention as a closure for a container or vessel, such as a large or heavy vessel which may contain contaminating fluids.

FIGURE 6 is a partial vertical sectional view, similar to FIGURE 5, showing another arrangement of the invention, as applied to a closure for receptacles or vessels.

In combination with the contractile clamp assembly of the invention, a sealing ring of hard metal or the like, and associated parts, as described in detail in the Watts and Hill Patent 2,766,829 of October 16, 1956, is employed. This sealing ring has oppositely disposed flexible lips and an external supporting rib, and the lips are actuated by tapered sealing surfaces on the parts being connected, when the ends of the parts are drawn or wedged together, as described in detail, particularly in connection with FIGS. 8, 10 and 11 of Patent 2,766,829. It will be understood that the disclosure of that prior patent, as to the construction and operation of the sealing ring and the wedging action of the clamping elements, as well as the applicable procedures disclosed and referred to in that patent, for drilling and completing oil wells, is incorporated herein by reference.

Figure 1:
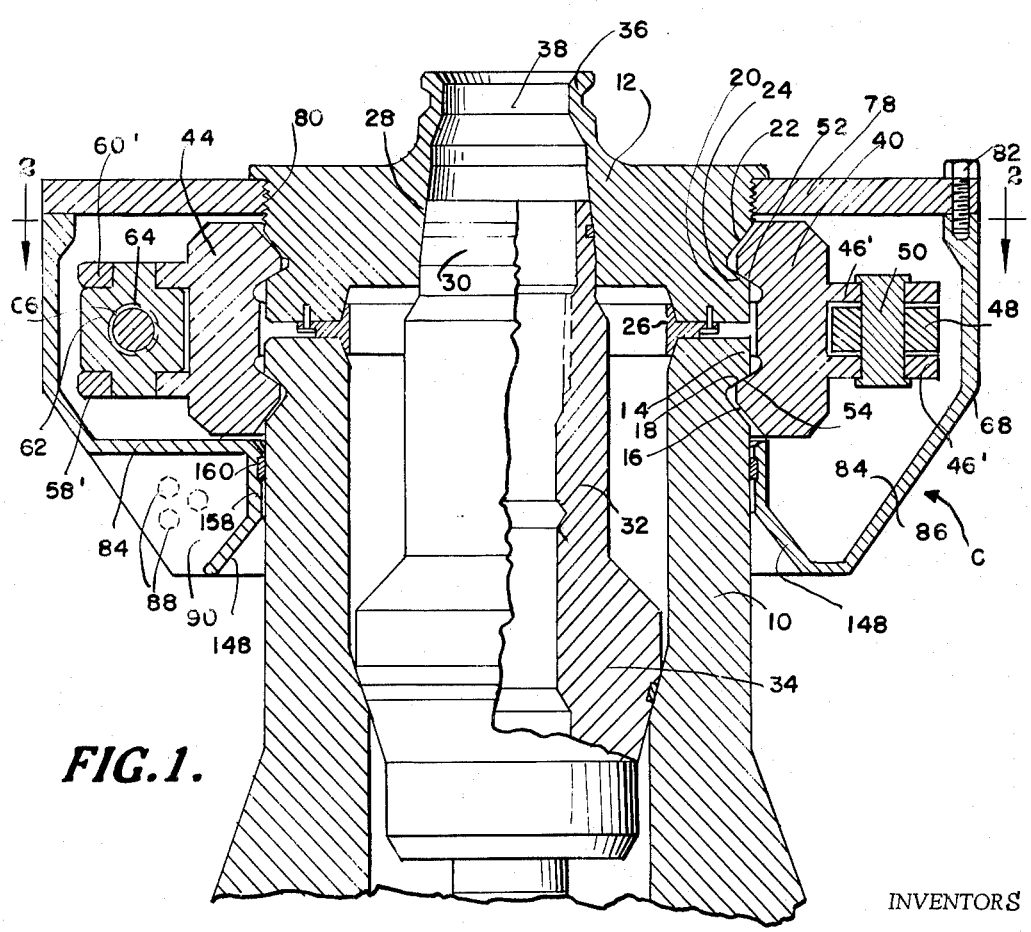

In FIGURE 1, 10 indicates the upper end of a tubing head to which is secured a Christmas tree cap or closure 12. The tubing head has a relatively small connecting end flange 14 defined by an annular groove 16 having an annular wedging surface 18 for receiving corresponding wedging abutments and surfaces, on the clamping elements as hereinafter described. The cap 12 is provided with a similar end connecting flange 20, an annular groove 22 and an annular wedging surface 24, for the same purpose. The wedging surfaces, 18 and 24, correspond in construction and operation with surfaces 18 and 22 of FIG. 8 of Patent 2,766,829, and the cooperating wedging surfaces on the clamping elements hereinafter referred to correspond in constructions and operation with surfaces 36 and 38 in FIGURE 8 of that patent.

Upon actuation of the clamping elements of the contractile clamp assembly, as hereinafter described, the cap 12 is drawn tightly against the upper end of the tubing head 10, and the interposed sealing ring 26, having oppositely disposed flexible sealing lips and an external supporting rib, as described in Patent 2,766,829, completes the seal between the cap 12 and the upper end of the tubing head 10. In the particular application shown in FIGURE 1, the cap 12 is provided with a central tapered bore 28 which seals against the tapered end 30 of a tubing hanger extension 32 which extends upwardly from the tubing hanger 34, the latter being landed on a tapered seat in the tubing head, in the manner more clearly shown in FIGURE 8. It will be understood that by means of the tapered sealing and wedging flange 36 around the flow opening 38 in the cap 12, a suitable valve may be attached for the usual flow control Christmas tree assembly (not shown), but reference can be made for further explanation, to valve 76 in FIGURE 7 of Patent 2,766,829. Again, it should be understood that the embodiment of FIGURE 1 is used by way of illustration, to shown how two particular wellhead parts may be connected by the contractile clamp assembly of the invention. Other wellhead parts can be similarly and selectively attached to and detached from one another, such as casing heads, tubing heads, blow out preventers, master drilling valves, spools, crosses, T's and such other devices as may be employed on wellheads, and it will be understood that the invention has other applications in conduit systems in general, as well as for closing and sealing vessels, by way of illustration.

Figure 2:
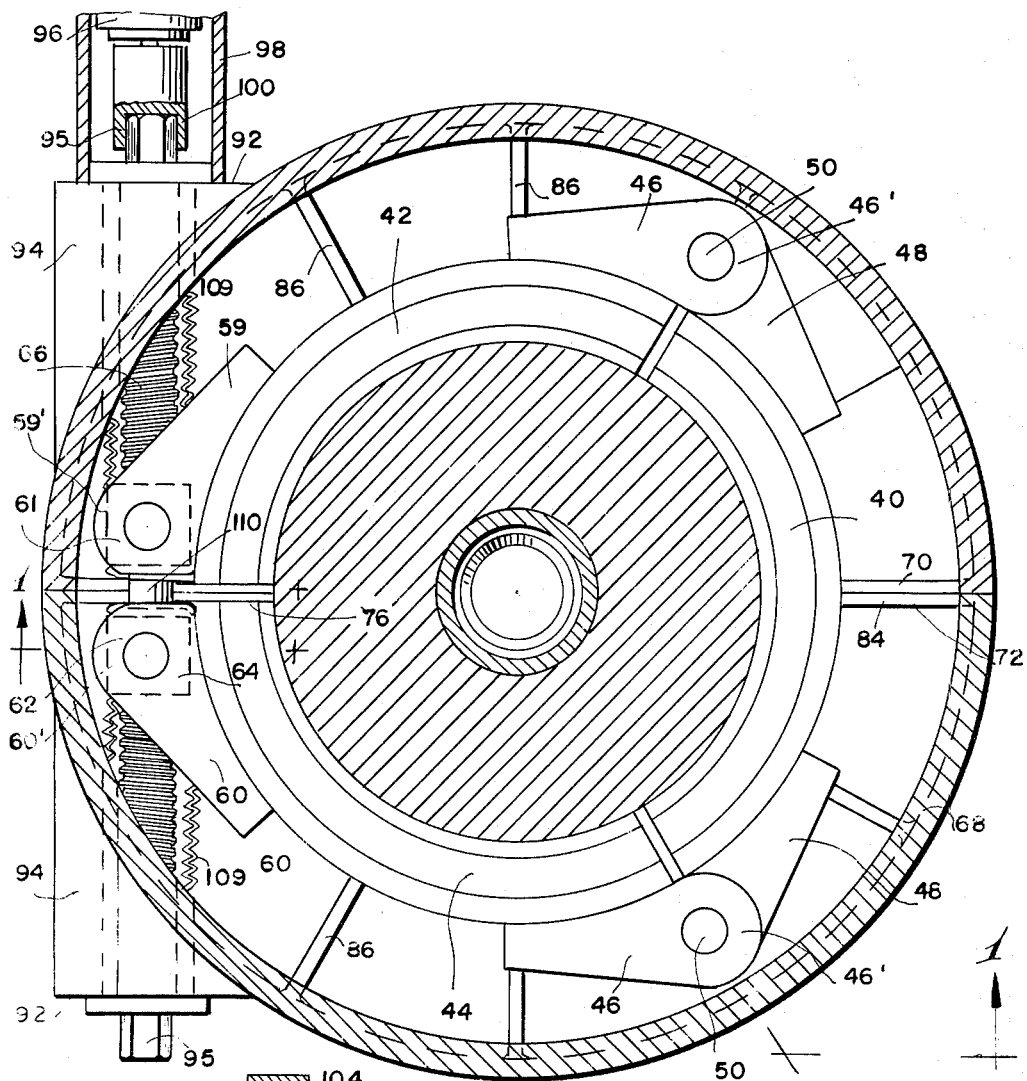
FIGURE 2 is a horizontal sectional view through the contractile clamp assembly, taken along the line 2—2 of FIG. 1, the clamping elements of the assembly being shown in their contracted or gripping position, against the flanged ends of the wellhead or other parts which are being connected by the assembly.

Referring to FIGURE 2, the contractile clamp comprises three clamping elements 40, 42 and 44, and they are of configuration in cross-section, as shown in FIGURE 1. The respective clamping elements where connected with element 40 are provide with integral brackets 46 and 48, the end of the bracket 46 being bifurcated as at 46' to receive for pivoting movement the end of the bracket 48, as shown in FIGURE 1, the ends being pivoted together by pintles 50, whereby the clamping elements may be moved between open and closed positions to clamp the wellhead parts together as hereinafter described, and as described in more detail in the said Patent 2,766,829. Each clamping element is provided with upper and lower wedging surfaces 52 and 54, indicated in FIGURE 1 and previously referred to, which engage the corresponding wedging surfaces 24 and 18 on the respective wellhead parts, when the clamping elements are contracted, in order to draw the wellhead parts together, and secure same to one another, and to deflect the flexible lips of the sealing ring 26 in order to complete the seal between the wellhead parts as described in the said Patent 2,766,829.

The clamping elements 42 and 44 are not directly pivoted to one another, but are provided with integral and special connecting brackets 59 and 60. These connecting brackets are bifurcated at their ends as at 59' and 60', indicated in FIGURE 1, and pivoted between the bifurcations of these ends, are respective trunnion members 61 and 62. These trunnion members are thus mounted for limited turning movement in their brackets, and are provided with threaded openings 64 (FIGURE 1), the threads of these openings in the respective trunnions being of pitch to receive respective oppositely threaded portions of an operating shaft or screw 66 (of the turnbuckle type), which is journalled for turning movement while being restrained against longitudinal movement in the housing of the contractile clamp assembly, as hereinafter described. It will be understood that when the operating screw 66 is turned in one direction, the trunnions 61 and 62, and their respective brackets 59 and 60 will be drawn toward one another to contract all of the clamping elements inwardly around the flanged ends of the parts being connected, and when the operating screw is turned in the opposite direction, the trunnions 61 and 62, and their respective brackets 59 and 60, are moved away from one another, to retract or open the clamping assembly.

The clamping elements 40, 42 and 44 are carried within a hollow annular carrier or housing 68, which for the purpose of convenience in manufacture, may be constructed into two half or semi-circular sections, joined together as by bolting, by flanges 70, 72 and 74, 76, as shown in FIGURE 2. The top of the housing is formed by an annular plate 78, which is threaded or otherwise secured at 80 to the wellhead or other part 12. This top plate may be bolted at spaced points to the top edge of the housing 68, to close same, after the clamping elements are assembled in the housing, as indicated by the bolt 82 (FIGURE 1).

The clamping elements 40, 42 and 44 when positioned in the housing, rest on a floor 84 formed by the upper edges of strengthening webs 86 which form part of the housing, and by the flanges 70, 72, 74 and 76 the latter extending only a part way up in the enclosed chamber (only to the extent of the upper edges of the webs 86, as shown in FIGURE 1). A manner of connecting the two sections of the housing together is indicated in FIGURE 1, by bolts 88, which connect depending flanges 90 of the respective housing sections together, it being apparent that a similar connection would be provided at the opposite side of the housing.

The interior of the housing is of such size that when the clamping elements are retracted, they may move outwardly from the position shown in FIGURE 1 to a position where the inner faces or edges of the clamping elements are entirely removed from the grooves 22 and 16 in the ends of the wellhead parts, whereby the one wellhead part 12 may be removed or taken away from the other wellhead part 10, taking with it the entire contractile clamp assembly and housing which is, of course, fixed to the upper wellhead part 12. The guiding floor 84 of the housing is arranged so that the wedging surfaces 52 and 54 on the clamps are properly aligned with the corresponding surfaces 24 and 18 on the ends of the wellhead parts, so that the clamping elements will be guided in their contracting movement when the assembly is actuated.

Figure 3:
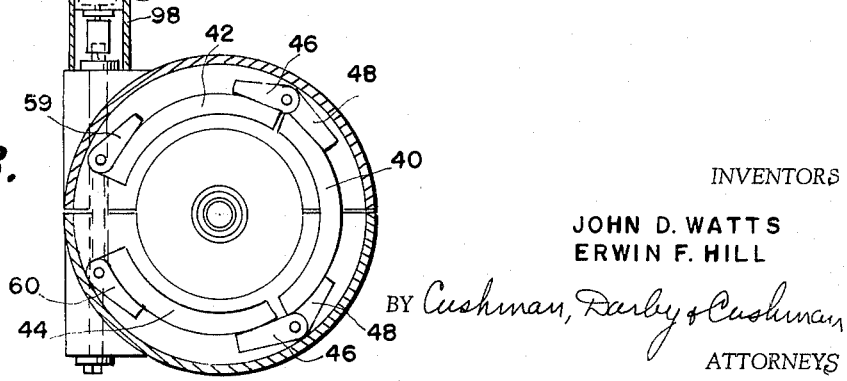
FIGURE 3 is a smaller somewhat diagrammatic view similar to FIGURE 2, but showing the gripping elements in the expanded or non-gripping position, which they assume before the connection is completed or in preparation for removing one part from another.

The operating screw 66 is journalled in the ends 92 of a hollow auxiliary housing 94, the parts of which are welded at one side to the respective sections of the main housing. At each end of the operating screw, there is a drive connection 95 which is fixed to the ends of the screw extending beyond the end walls of the auxiliary housing 94. Suitable power operated means, such as a conventional air motor arrangement 96 in a casing 98, may be employed to selectively turn the operating screw in opposite directions, to open and close the clamp elements, as diagrammatically illustrated in FIGURES 2 and 3. Referring to FIGURE 2, the shaft of the air motor carries a speed wrench socket 100, adapted to fit over either one of the drive connections 95, to provide a well known speed wrench connection. As diagrammatically illustrated in FIGURE 3, air lines 104 and 106 extending from the remote-control point, enter the casing 98 and serve to drive a turbine arrangement 108, in order to selectively turn the operating shaft in opposite directions. It will be understood that any conventional pneumatically operated equipment may be provided, to turn the shaft 66, as referred to. If desired, a suitable shield 109 of the bellows type may be provided within the housing 94 and around the shaft 66, to protect it from foreign matter.

It will be observed that shaft 66 has a smooth undercut part 110 between the threaded portions thereof where it passes above the walls 74 and 76. By reason of the threaded connections between the operating screw 66 and the trunnion members 61 and 62, rotation of the screw in one direction will contract the clamping assembly inwardly around the flanged ends of the wellhead parts 10 and 12, and by reason of the engagement of the wedging surfaces 52 and 54 of the clamping elements, with the co-operating wedging surfaces 24 and 18 on the flanges of the wellhead parts, as described in the Watts et al. Patent 2,766,829, the parts to be connected will ge drawn toward and secured to one another, and at the same time, the lips of the sealing ring 26 will be deflected in the manner described in the Watts patent to seal the resulting connection. Of course, when the operating screw is turned in the opposite direction, under the control of suitable pneumatic valve means at the remote operating point, as at the derrick floor in offshore oil well operations, the clamping elements 40, 42 and 44 will be expanded and moved out against the outer wall of the housing 68, while resting on the floor 84 thereof, so that the wellhead parts may be selectively disengaged from one another, and in the instance shown, the wellhead part 12 carrying the assembly C may then be entirely removed or taken away from the lower wellhead part 10.

The particular application of the invention illustrated in FIGURE 4, is for completing an oil well on the ocean floor, where it may be desired to position the wellhead parts, including the control equipment, perhaps many hundreds of feet below the surface of the water.

The procedures in manipulating the casing, drill stem, tubing, casing and tubing heads and control equipment may vary in accordance with the local conditions which are encountered, including the depth of the water, the condition of the ocean floor, and the type of platform from which the operations are carried out. As will be apparent from the descriptions herein, including the disclosure of the Watts et al., Patent 2,766,829, and the prior patents to which it refers, full control of the well may be provided, both within and around the casings, drill pipe and tubing being manipulated, and the present invention facilitates and improves these features of control, even under the difficult conditions contemplated.

The operations of drilling and running of casing and tubing, and other associated operatons, may be performed from platforms erected on caissons extending from the ocean floor, or from any type of floating platform, and the invention herein described may be usefully employed in association with various methods or arrangements for drilling and completing wells under these difficult conditions. FIGURE 4 is intended to illustrate a simple procedure which can be practiced while usefully employing the equipment of this invention, but it will be understood that the invention may be applied to other more complex completion procedures, involving more strings of casing, and additional and more complex heads, including dual tubing string completions.

In FIGURE 4, the ocean floor is below the view, and if the type of bottom requires same, a scaffold-like metal foundation structure 110 may be supported on the ocean floor. The first or surface string of casing is designated 112 and attached thereto is a casing head 114.

When the foundation 110 is lowered, it may be equipped with a plurality of relatively rigid guide rods 126 terminating in flexible guiding lines 128 which extend to the surface of the water, and in the arrangement shown, the top plate 129 of the housing of the clamping assembly may extend outwardly, and be provided with openings 130 which will pass the lines 128 in the rods 126, to guide the whole assembly downwardly to proper position on the foundation, when it is lowered by a lift nipple or casing (not shown), under control of the appropriate and conventional mechanisms on the derrick floor at the surface of the well.

Drilling through the casing 112 may be performed under control, after which an inner string of casing, with its hanger, may be lowered downwardly through the aforementioned nipple and through the control equipment to be landed in the hanger seat 140 of the casing head 114. Incident to or after the lowering of the inner casing and its hanger, by means of a lift nipple or casing which passes downwardly through the aforementioned nipple, this inner casing so landed may be cemented in the manner well-known in the art and described or referred to in the said Patent 2,766,829. Thereafter, the clamping elements of the contractile clamp assembly used to lower the control equipment may be retracted and the control equipment removed. The inner string of casing 142 previously referred to is shown extending downwardly through and below the outer casing 112, being supported in the casing head by a now conventional double-tapered hanger 144.

It will be noted that the sealing ring 156 is shown fixed or pinned in the interior sealing seat of the tubing head 162 (FIGURE 4), just as the sealing ring 26 was lowered with and secured to the Christmas tree cap 12 in FIGURE 1. Of course, the sealing ring could have been made as an integral part of the wellhead or other part or closure being lowered, or it could be secured to as being pinned to the part already in place, or it might be integral with that part, having an upwardly extending lip presented to receive and seal with the part being lowered.

Returning now to FIGURE 1, it will be observed that the lower end of the housing 68 is formed to provide an outwardly tapered guide surface 148, so that when it is desired to lower a wellhead part, such as a blow-out preventer, downwardly onto the casing head 114, to form a sealed attachment with this casing head, the guiding surface 148 will serve to center the contractile clamp C as it moves downwardly over the flange 150 at the upper end of the casing head 114, to a point where the clamping elements are horizontally aligned with the groove 152 having the wedging surface 154, in the head 114.

As previously described in connection with FIGURE 1, the sealing ring 156 which is carried by or pinned to the lower end of the tubing head 162 (FIGURE 4) will have its sealing lips deflected when the adapter engages the upper end of the casing head, and these lips will be fully deflected when the weight of the parts above it rest on the external rib of the sealing ring, and when the clamping elements of the contractile clamp C are closed or contracted, to perfect the seal. Referring again to FIGURE 1, the lower part of the housing of the contractile clamp, above the guide 148 is of cylindrical shape, as at 158, and a gasket or O-ring seal 160 may be provided in the cylindrical portion, to prevent foreign matter from entering the housing of the clamping assembly.

After the control equipment has been removed, and with the lower end of the casing cemented off as may be required, the tubing head with its control equipment may be lowered as a unit, and attached to the casing head 114, following the same procedure as previously described. In FIGURE 4, the tubing head is shown at 162 and it carries with it one of the contractile clamp assemblies C2, so that it may be engaged with and seal upon the casing head 114 around and over the hanger 144 under remote-control. At this time, the lower end of the tubing head with its connected sealing ring seal against the casing head as well as with the upper tapered end of the hanger 144, as at 164, as is well-known in the art and described in the said Patent 2,766,829. A blow-out preventer, of rated size with the tubing head 162, is secured and sealed to the upper end of the tubing head by a smaller contractile clamp assembly when the parts described including the tubing head and preventers, have been lowered as a unit, the drill may be operated to drill downwardly through the casing 142, in preparation for tubing running operations or other necessary completion operations incident thereto.

It will be understood that in carrying out these operations described, any of the well-known mechanisms for maintaining control within and around the casings and tubings being manipulated, as disclosed in Patent 2,766,829, may be employed.

After drilling through the casing 142, and while the control equipment is still in place, a tubing string 172 (FIGURE 4) may be lowered into the well, the said string having at its upper end a tubing hanger 174 which is landed and sealed in the hanger seat 175 of the tubing head 162. Thereafter, the blowout preventers may be removed leaving the well in the condition shown in FIGURE 7, with the hanger landed. Of course, any conventional lock-down means may be employed, if necessary, to lock the tubing hanger in its seat, and any well-known means may be used to close or plug the tubing during the transition, as disclosed or referred to in the Watts et al. Patent 2,766,829. Any hanger lock-down means such as locking screws, could be likewise actuated by remote control from the derrick platform. It will be noted that the hanger 174 has an extension 176 terminating in an inwardly tapered upper end 178 which is provided with a packing ring 180 for purposes of sealing with a closure which constitutes the lower end of Christmas tree equipment, as hereinafter described, and as referred to in connection with FIGURE 1.

It should be observed that by reason of the presence of the remote-controlled contractile clamps flexibility in positioning and removing control equipment is available, so that any of the desired operations involved in completing a well, may be performed, while maintaining same under control at all times.

It will be observed that in FIGURE 4 inclusive, the usual side outlets 181 and 182 are shown on the casing head 114 and the tubing head 162, for any desired circulation of fluid as in connection with cementing operations, washing the well etc. These outlets may be provided with wedging and sealing flanges, as described, so that valves or other conduit connections may be made (see valve 76 in FIGURE 7 of Patent 2,766,829), to carry the outflow to any suitable point of disposal, such as mud tanks, etc. Appropriate conduits may be attached to connect with suitable equipment at the surface of the water, as desired.

Using similar contractile clamp and procedure a Christmas tree manifold and related production equipment or master valves with remote-control fluid lines can be secured to the tubing head 162 by flange 140.

The contractile clamp assembly $C^4$ is operated through its remote-control connections or pipes 196 to contract the clamping elements around the ends of the two wellhead parts, thus wedging them together against the exterior rib of the sealing ring, and securing them firmly to one another. It will be noted that the upper end 178 of the tubing hanger forms a seal in the tapered seat 198 formed at the lower end of the Christmas tree manifold. The taper of the outer surface of the end 178 of the hanger is slightly steeper than the taper of tapered seat 198, so that the end 178 is slightly deflected to make a tight seal, a packing ring 180 also being present to assist in making a leak-proof joint.

When the well is under production, it may discharge oil through a pipe 200, which may be flexible, and which extends from the upper end of the Christmas tree to storage tanks at the surface of the water. The Christmas tree is provided with any suitable suspension means 202 for use in lowering it to position. The valves 188 and 190 may be operated by remote-control, by means of the fluid lines 204 and 206 operating any well-known mechanism within the manifold to open and close the valves as is known in the art. Instead of the manifold 184, a more conventional assembly of Christmas tree valves may be used, as for instance indicated in FIGURE 7 of Patent 2,766,829.

It will be understood that whenever required, the contractile clamping assembly may be actuated to retract the clamping elements and remove the Christmas tree. Other wellhead parts, such as master drilling valves or blowout preventers might be substituted for the Christmas tree, it being understood that such other wellhead parts would have connected to their lower ends, the contractile clamp assembly $C^4$ which is shown in FIGURE 8 attached to the Christmas tree.

FIGURE 9 shows another arrangement of wellhead parts wherein one or more master valves, such as $M^1$ and $M^2$, may be mounted on a casing head 208 by means of contractile clamping assemblies $C^5$ and $C^6$. The nipple or pipe 210 which lowers these valves to position may likewise carry at its lower end, and secured thereto, another of the contractile clamping assemblies $C^7$. It will be understood, as previously described, that the lower end of the valve $M^1$ is equipped with an integral or attached adapter 212 having the appropriate sealing and wedging flange, and carrying the contractile clamp assembly $C^5$, and at its upper end, the valve has an integral or attached adapter 214 which is formed with a sealing and wedging flange, all as previously described, in order to receive the contractile clamping assembly $C^6$ carried by the valve $M^2$. The valve $M^2$ is similarly formed with a lower adapter to receive and carry the assembly $C^6$, and it has an upper adapter to receive the clamping assembly $C^7$ which is carried on the nipple 210, as previously referred to. If desired, one valve could have upper and lower adapters formed to carry the clamping assemblies, so that a single piece of equipment would carry two clamping assemblies, one at each opposite end.

With the arrangements as described, and with appropriate remote-control fluid lines extending from each of the pieces of equipment, great selectivity is provided in positioning equipment on and removing it from a well. For instance, the valve $M^1$ may be closed, and by retracting the elements in the assembly $C^6$, the valve $M^2$ or other part which might occupy its place, may be removed from the wellhead.

FIGURE 5 illustrates the application of the invention to the closing of a heavy walled vessel or receptacle 216. The upper open end of this vessel is provided with a sealing and wedging flange 218 similar to the flange 14 described in connection with FIGURE 1, and the closure or cap 220 is provided with a similar sealing and wedging flange 222 similar to the flange 20 described in connection with FIGURE 1.

The inner sides of these flanges 218 and 222 are formed to provide the sealing surfaces which deflect the lips of the sealing ring 224 in the manner described in the said Patent 2,766,829. The lid or closure 220 has one of the contractile clamp assemblies $C^8$ secured thereto, and when the closure is lowered onto the top of the receptacle, until the sealing ring carried by the closure has its lips at least partially deflected, then the clamping assembly $C^8$ may be actuated, if desired, by remote-control in order to seal the closure 220 tightly over the mouth of the receptacle. If the closure is very heavy, it may be lowered by a line 226 which passes through an eye 228 on the lid or cover.

Such an arrangement, as described in connection with FIGURE 5, might be used in closing a receptacle in a closed room or chamber, under circumstances where it would be undesirable for a person to enter the room. A suitable boom or other means could be operated from outside the room, to lower the cover 220 on the line 226 until it is in position on the mouth of the receptacle, at which time the clamping assembly could likewise be operated by remote-control to lock the cover in place. Similarly, the cover could be removed by remote-control, without the necessity of anyone entering the room.

In FIGURE 6, a modification of the embodiment of FIGURE 5 is shown in which the cover 230 is provided with an integral flexible sealing lip 232, of a type as described in FIGURE 1 and other figures of a copending application of John D. Watts, Serial No. 62,008, filed October 11, 1960, now U.S. Patent No. 3,150,889, granted September 29, 1964. The exterior surface 233 of this sealing lip is normally of a slightly steeper taper than the interior tapered sealing surface 234 at the upper end of the wall 236 of the receptacle. When the cover 230 is lowered, the lip 232 is deflected to form a tight metal to metal seal, as previously described, the dotted line 240 diagrammatically indicating to an exaggerated extent, the position of the tapered face 233 before the lip was deflected. The cover at the upper end of the lip 232 is provided with a stop surface 242 which contacts the upper end 244 of the receptable when the lip 232 is properly deflected to form the seal. Thus, surface 242 constitutes a stop surface when it contacts surface 244, just like the ends of the parts being connected constitute stop surfaces when they contact the external rib of the sealing ring, as described in the said Patent 2,766,829. In FIGURE 6, the cover 230 carries a contractile clamping assembly $C^9$, which may be operated if desired, by remote-control means, to lock the cover onto the top of the receptacle. It will be understood that the integral sealing ring arrangement of FIGURE 6 could be used on other parts as described herein.

Contractile clamping assemblies of the invention may be used in pipeline systems, where it may be desirable to disconnect parts of the system and replace same, at inaccessible points, or in rooms where it is not safe for a person to enter. The clamping assemblies according to the present invention are not restricted to use with piping and the like having a vertical axis, but may be advantageously used where the piping or the like is non-vertical, for instance where it is horizontally extending.

Various other applications and combinations of the invention will be apparent from the above, and same are intended to be embraced by the following claims.

We claim:
1. Apparatus for effecting a sealing connection comprising: a first fluid confining element, an annular wedging surface externally thereon adjacent an end thereof; a second fluid confining element, an annular wedging surface externally thereon adjacent an end thereof; a clamping assembly loosely carried by said second fluid confining element comprising a plurality of arcuate segments, pivot means comprising hinge brackets mounted adjacent the ends of each arcuate segment and pin means pivotably joining said hinge brackets to one another; remote control means for generally radially expanding and contracting said clamp about said pivot means; means defining first and second complementary wedging surfaces on said arcuate segments in engagement with said first and second fluid confining element wedging surfaces to axially draw said second fluid confining element toward said first fluid confining element to effect sealing therebetween when said clamp is contracted; and means peripherally housing said clamp, said housing means including generally radially extending, annular top and bottom walls joined by a generally axially extending side wall, said housing means being secured to said second fluid confining element adjacent said end of said second fluid confining element; said clamp being expansible in said housing to a position wherein the clamp is disengaged from the first and second fluid confining element wedging surfaces and said hinge brackets containing said pins at the radially outer extent of the movement thereof engage the inner peripheral surface of said housing side wall to thereby radially displace said clamp segments and axially align them with said second fluid confining element and positively prevent movement of said clamp segments transverse to said second fluid confining element, whereby said clamp and said housing can be accurately guided toward and away from said first fluid confining element without the possibility of engagement between said clamp segment and said fluid confining elements; said clamp being contractable to a position wherein said clamp wedging surfaces are engaged with said fluid confining element wedging surfaces and the clamp segments and pivot means are spaced radially inwardly from the housing side wall.

2. Apparatus according to claim 1 additionally comprising a sealing assembly carried on said second fluid confining element, said sealing assembly comprising an annular hard metal generally axially directed, elastically deflectable lip and means defining a tapered sealing surface on said lip arranged to be deflected into stressed sealing engagement with first fluid confining element.

3. Apparatus as set forth in claim 1 wherein said housing top wall extends radially outwardly beyond said housing side wall and includes means defining a plurality of guideline receiving openings therethrough whereby said clamp, housing and second fluid confining element can be accurately axially guided toward the first fluid confining element.

4. Apparatus as set forth in claim 1 wherein said remote control means for generally radially expanding and contracting said clamp about said pivot means comprises a remotely rotatable turnbuckle and wherein said housing additionally includes a pair of extensions substantially enclosing said turnbuckle, said housing being comprised of a pair of semi-annular sections, each section including one of said extensions whereby the securement of said housing to said second fluid confining element is facilitated.

References Cited by the Examiner

UNITED STATES PATENTS

| | | | |
|---|---|---|---|
| 2,761,707 | 9/1956 | Herman | 285—367 |
| 2,858,114 | 10/1958 | Parris | 285—45 X |
| 2,878,041 | 3/1959 | Hobbs | 285—367 |
| 2,903,066 | 9/1959 | Brown | 166—46 |
| 2,944,602 | 7/1960 | Brown | 166—46 |
| 2,956,818 | 10/1960 | Dickerson | 285—18 |
| 2,962,096 | 11/1960 | Knox | 285—315 |
| 3,019,036 | 1/1962 | Stanger | 285—18 |
| 3,026,128 | 3/1962 | Wills | 285—18 |
| 3,102,591 | 9/1963 | Raulins. | |
| 3,137,348 | 6/1964 | Ahlstone. | |

FOREIGN PATENTS

| | | |
|---|---|---|
| 1,245,874 | 10/1960 | France. |

CARL W. TOMLIN, *Primary Examiner.*

CHARLES E. O'CONNELL, *Examiner.*